United States Patent [19]

Anderson et al.

[11] Patent Number: 4,562,615
[45] Date of Patent: Jan. 7, 1986

[54] APPARATUS AND METHOD FOR DISPENSING UNIFORM QUANTITIES OF HAM PRODUCTS

[75] Inventors: James E. Anderson; Terry L. Holmes, both of Madison, Wis.

[73] Assignee: Oscar Mayer Foods Corporation, Madison, Wis.

[21] Appl. No.: 604,007

[22] Filed: Apr. 26, 1984

[51] Int. Cl.[4] .............................................. A22C 11/02
[52] U.S. Cl. ............................................ 17/32; 17/39
[58] Field of Search ................... 17/32, 35, 38, 39, 49; 141/156; 99/472; 137/536

[56] References Cited

U.S. PATENT DOCUMENTS

| | | | |
|---|---|---|---|
| 337,350 | 3/1886 | Russell | 137/536 |
| 3,009,195 | 11/1961 | Dixon | 17/39 |
| 3,473,579 | 10/1969 | Orloff | 141/156 |
| 3,537,129 | 11/1970 | Orloff | 17/35 |
| 3,599,556 | 8/1971 | Madsen | 99/272 |
| 3,797,069 | 3/1974 | Von Lersner et al. | 17/32 |
| 3,908,536 | 9/1975 | Bajcar | 99/472 |
| 3,908,537 | 9/1975 | Bajcar et al. | 99/472 |
| 4,032,049 | 6/1977 | Roberts | 222/238 |
| 4,205,415 | 6/1980 | Orchard | 17/32 |
| 4,382,404 | 5/1983 | Hawley et al. | 99/472 |
| 4,445,548 | 5/1984 | Neuman | 141/1 |

Primary Examiner—James M. Meister
Assistant Examiner—John L. Knoble
Attorney, Agent, or Firm—Joseph T. Harcarik; Thomas R. Savoie; Daniel J. Donovan

[57] ABSTRACT

Improved vacuumizing apparatus and method for dispensing uniform volumes of ham products. The apparatus comprises a hydraulically actuated knife and an improved spring biased check valve. The method is concerned with making sectioned and formed ham products from pre-tumbled chunks of ham.

6 Claims, 3 Drawing Figures

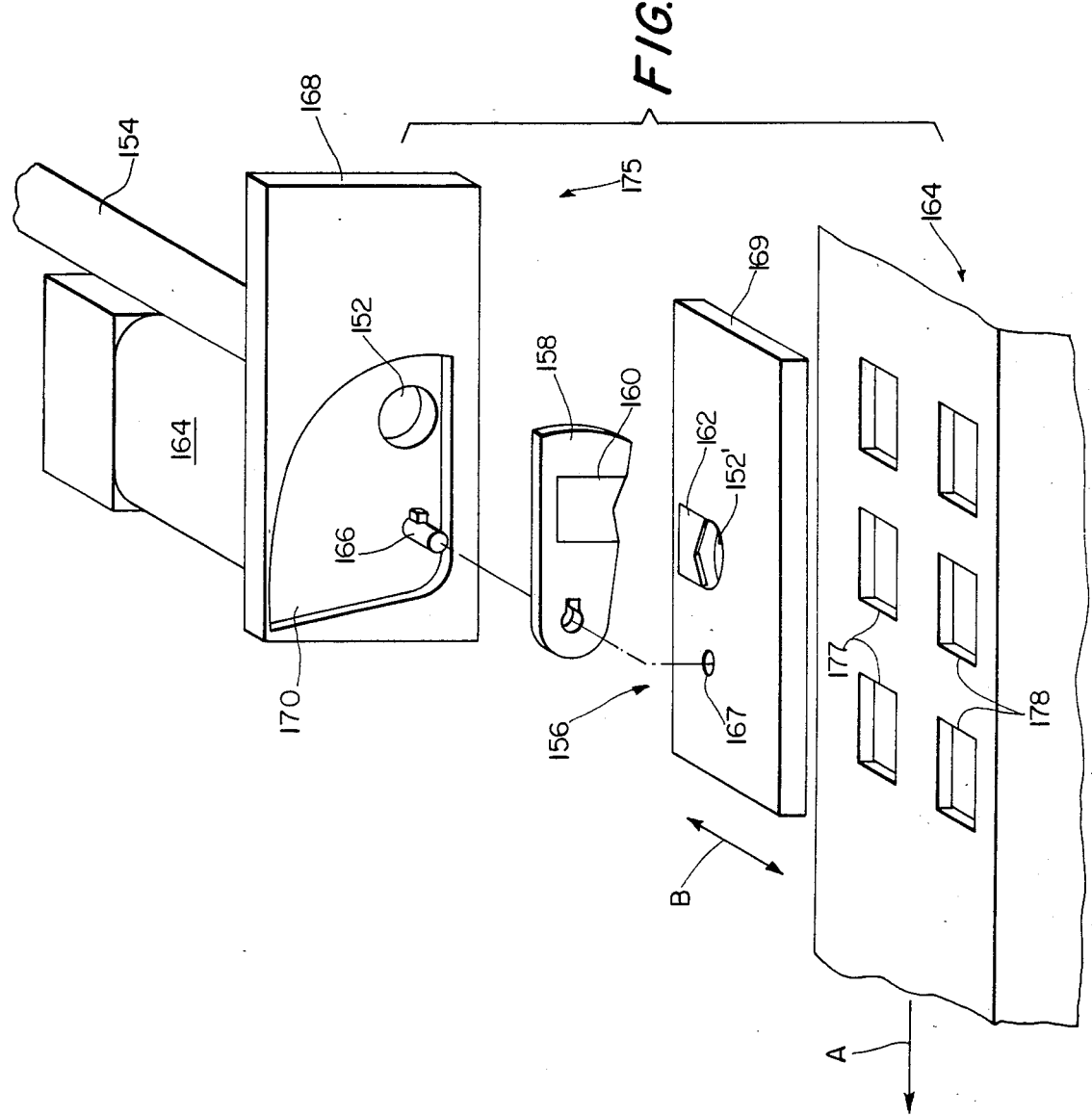

APPARATUS AND METHOD FOR DISPENSING UNIFORM QUANTITIES OF HAM PRODUCTS

BACKGROUND OF THE INVENTION

1. Field of the Invention

The present invention relates to a method and apparatus for dispensing uniform quantities of ham product. More particularly the invention relates to ham products which are made up of a plurality of pretumbled chunks of ham, the product being called a sectioned and formed ham.

2. Description of the Art

In the processing of various meat products it is desirable to provide for packaging the product while relatively free of oxygen. Where the product is packaged by volume, it is desirable to perform the volume measuring function when the product is fully deaerated, as it is then free of voids.

U.S. Pat. No. 3,537,129 discloses a continuous stuffing system for handling food products including large chunks of meat. Food product is vacuumized and then conveyed into a separate stuffing system by a cylindrical reciprocating transfer pump. The separate stuffing system can be a volumetric metering stuffer such as described in U.S Pat. No. 3,473,579.

A further vacuumizing apparatus is disclosed in U.S. Pat. No. 3,599,556. This type of apparatus has been in commercial use for some time in processing meat emulsions and is known as an "Anco" vacuumizer. Both the foregoing devices are relatively complex and it will be understood by those of ordinary skill in the art that a simple device, capable of dispensing a sectioned and formed ham product from chunks of ham, is highly desirable.

SUMMARY OF THE INVENTION

In accordance with the present invention, there are provided a simplified apparatus and method for dispensing uniform volumes of vacuumized ham products. The apparatus comprises:

(a) a vacuum chamber;

(b) means for introducing meat pieces into said vacuum chamber (c) means for evacuating said chamber to remove air from said meat pieces therein;

(d) pumping means for pumping meat product out of said vacuum chamber, said pumping means comprising:

(i) a pumping chamber at the bottom of said vacuum chamber having an outlet opening at an end wall of said pumping chamber for discharge of meat product therethrough; and (ii) a piston moveable at the bottom of said vacuum chamber from a first position outside said pumping chamber to a second position within said pumping chamber, said piston fitting closely within said chamber;

(e) a conduit for conveying meat product from the outlet opening of said pumping chamber to a discharge opening for dispensing said meat product into a container;

(f) a hydraulically actuated knife member located adjacent said discharge opening and moveable to cut off meat product dispensed through said discharge opening by motion between a first, open, position adjacent said discharge opening and a second, closed, position in which said knife member covers said discharge opening;

(g) hydraulic means for moving said knife member from said first position to said second position and from said second position to said first position; and (h) check valve means in said conduit at the outlet opening of said pumping chamber and comprising:

(i) a valve seat in said outlet opening of said pumping chamber;

(ii) a valve member mounted in said conduit for seating against said valve seat to close said outlet opening of said pumping chamber; and (iii) a unitary spring biasing said valve member against said valve spring, the compressive strength of said valve seat being such that a force of at least 15 psi gage is required in said pumping chamber to open said check valve; whereby motion of said piston from said first position to said second position in said pumping chamber moves a pre-determined amount of meat product through said outlet opening of said pumping chamber and said conduit to dispense a pre-determined quantity of meat product through the discharge opening of said conduit, said conduit forming an open passageway free along its entire length of any obstruction other than said check valve.

The method comprises:

(a) providing a plurality of pre-tumbled, adherent chunks of ham, each weighing from ¼ to four pounds, in a vacuum chamber;

(b) evacuating said chamber to remove air from said meat chunks therein;

(c) moving a piston to positively displace a pre-determined volume of said mass of ham product from said chamber through a check valve into the inlet end of a conduit, through said conduit and out the discharge end of said conduit, said check valve being mounted in said conduit and said conduit being free along its length of any obstruction other than said check valve, said check valve closing when the motion of said piston stops;

(d) hydraulically actuating a knife member located at the discharge end of said conduit from a first position adjacent said discharge end to a second position closing said discharge end, to cut off the pre-determined quantity of ham product for dispensing said pre-determined quantity of said ham product into a container;

(e) moving said piston back with said check valve closed and with said knife member closing said discharge end of said conduit;

(f) hydraulically actuating said knife member from said second position to said first position to open said discharge end of said conduit; and (g) repeating steps (c) through (f) to dispense uniform quantities of ham product.

BRIEF DESCRIPTION OF THE DRAWINGS

FIG. 3 is a diagrammatic exploded side elevational view of a portion of FIG. 1 in which the upper elements of the drawing are rotated backwards for purposes of illustration.

DESCRIPTION OF A PREFERRED EMBODIMENT

Figure 1:
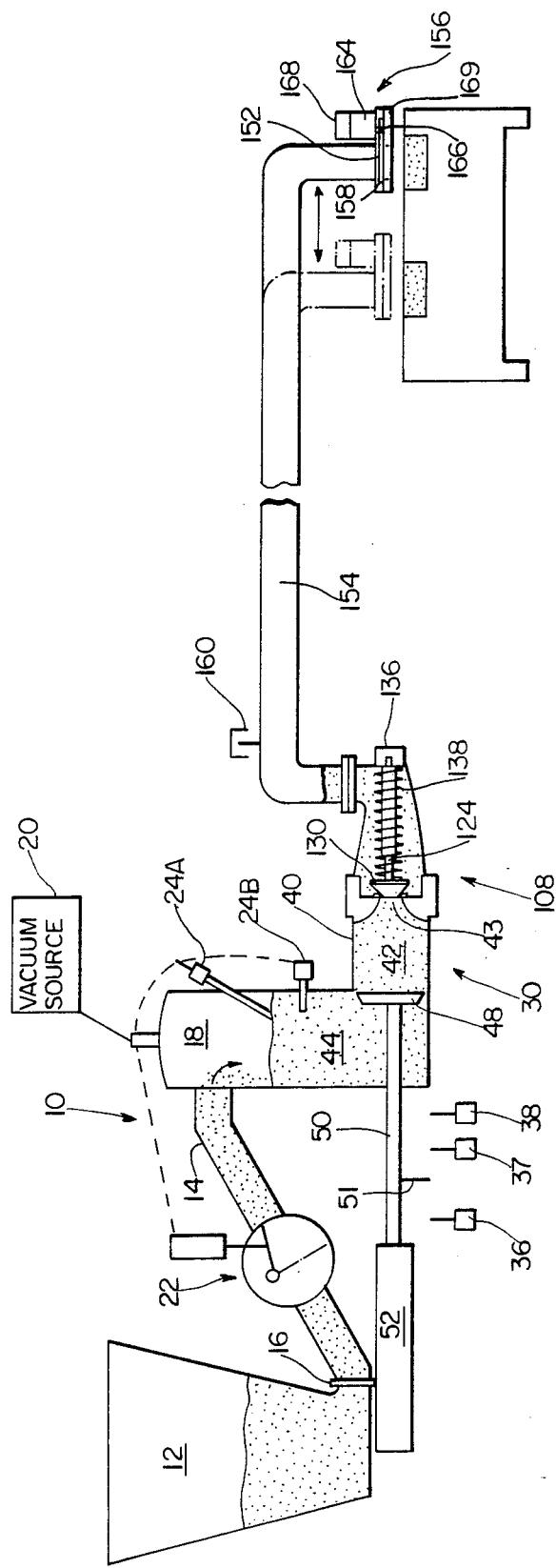
FIG. 1 is a diagrammatic side elevation view, partly in section, illustrating the apparatus of the invention for dispensing uniform volumes of vacuumized ham products.

The vacuumizing apparatus indicated generally at 10 in the drawing constitutes a preferred embodiment of this invention. It preferably comprises a hopper 12, which is arranged to receive food products such as chunks of ham. For example tote bins filled with meat chunks may be elevated and dumped into the hopper by fork lift trucks or the like. The invention is particularly suited to making sectioned and formed ham products, from pre-tumbled chunks of ham, which simulate whole hams. These chunks of ham, weighing from about ¼ to four pounds each and usually from about ¾ to three pounds each, are pre-tumbled in known manner to render the chunks very adherent to one another such that when deaerated, packaged and cooked, the product is a unitary ham product which retains its integrity when sliced, etc. Then products are conveniently packaged under vacuum in flexible, transparent plastic packages in which the ham product is cooked and sold.

The vacuumizing apparatus further comprises an enlarged generally tubular conduit 14 which opens into a lower outlet fitting 16 of the hopper 12, and a vacuum chamber 18, which is suitably connected to a vacuum source 20. A metering valve, generally indicated at 22, is used to meter flow of the food product through the conduit 14. Level sensing probes 24A and 24B extend into the vacuum chamber 18 and are operable to cause the metering valve 22 to move to the closed position when the product level in the chamber 18 reaches the probe 24A and to open when the product level falls below probe 24B.

The apparatus depicted in FIG. 1 is of the type described, for example in U.S. Pat. No. 3,599,556. Equipment of this type is sold commercially for use with meat emulsions and is widely known as an "Anco Vacuumizer". The apparatus further comprises a pump 30 which is arranged to pump the food product from the vacuum chamber. In a form of the device disclosed in U.S. Pat. No. 3,599,556, pump 30 serves to pump the product to an accumulator from which it is discharged by conventional means into molds or flexible casings. In the present invention, there is no accumulator and the product is pumped directly from the product outlet of the vacuumizing apparatus through an unobstructed conduit 154 from which it is discharged into a product mold or flexible casing.

Pump 30 comprises a housing 40 which defines a generally cylindrical pump chamber 42 opening into a lower portion 44 of the vacuum chamber 18. Pump 30 comprises a piston 48, which is reciprocable within the pump chamber 42 and a piston rod 50, which is connected between the piston 48 and a hydraulic cylinder 52 to reciprocate the piston 48. Hydraulic cylinder 52 operating the pump is controlled by a conventional control circuit which includes limit switches actuated by motion of piston and 50 at locations external to vacuum chamber 18. Hydraulic fluid is fed to cylinder 52 to force the piston to move in an interval established by limit switches 36-38. Piston 48 is moveable from a first position 48$^a$ (FIG. 2) to the left of the position shown in FIG. 1 to a second position 48$^b$ with piston 48 received as a close fit in cylinder pump chamber 42. The first and second positions of piston 48 are determined by the location of limit switches 36 and 37 which are engaged by member 51 on piston 50. Piston 48 is optionally moveable to the right to a third position 48$^c$ the location of which is determined by limit switch 38. The piston is optionally further moveable to one or more further positions. Thus, pump 30 is adapted to pump the food product from the lower portion 44 of the vacuum chamber 18 outwardly through the pump chamber 42.

Figure 2:
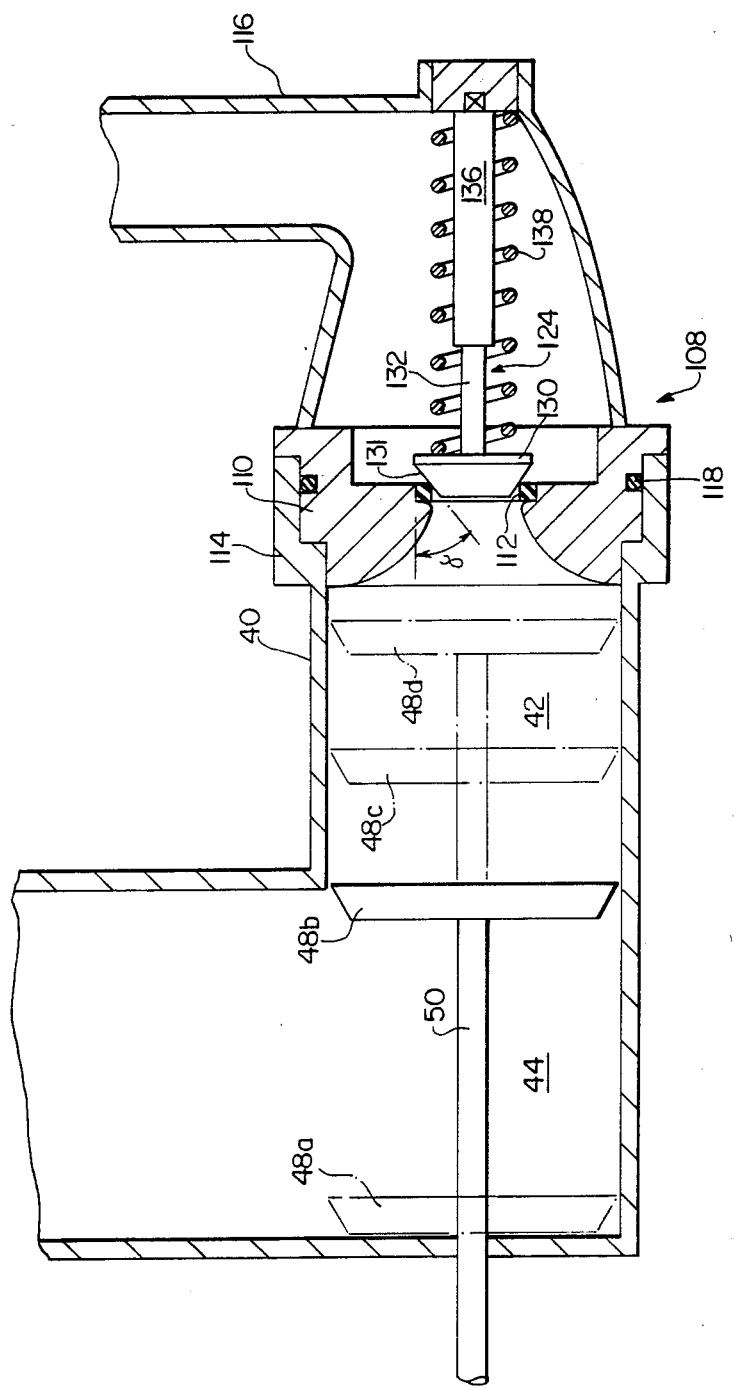
FIG. 2 is an enlarged diagrammatic exploded side elevational view of a portion of FIG. 1.

The vacuumizing apparatus 10 further comprises improved check valve means 108. The improved check valve means 108 permits discharge of the food product from the pump chamber 42 and prevents return flow of the food product to the pump chamber. As best shown in FIG. 2, a generally annular plate 110, which forms a valve seat 112 as part of the check valve means 108 is recessed in a flanged edge portion 114 of the housing 40 outwardly of the piston 48. A generally bell-shaped outlet fitting 116 is bolted or otherwise suitably mounted to the edge portion of the annular plate 110. A compressible sealing ring 118 is disposed between the annular plate 110 and the flanged edge portion 114 of the housing 40.

In addition to the valve seat 112, the check valve means 108 comprises a spring biased valve member 124 on the opposite side of the valve seat 112 from the piston 48. As shown, spring biased valve member 124 is in the form of a tapered plug 130 carried on a piston rod 132 for movement within the outlet fitting 116. The piston rod 132 is slidable within a bore in a generally cylindrical member 136 secured within outlet fitting 116. Valve member 124 is baised by spring 138. Food product pressure in chamber 42 caused by forward motion of piston 148 therein moves plug 130 to the right which compresses spring 138 as check valve 108 opens. A heavy duty spring, such as a spring requiring at least 15 psi (gage) on plug 130 to open the check valve, is preferred. The spring preferably comprises a noncorroding metal such as stainless steel since food product contacts the spring. Preferably, outlet 43 of chamber 42 has a cross-sectional area of at least four inches and up to eight inches and spring 138 has a compression strength of about 250–400 lbs and preferably about 300–350 lbs such that a compression force of at least about 250 lbs, preferably at least about 300 lbs, is required to be applied against valve plug 130 to open check valve 108. Tapered plug 130 preferably has a surface 131 tapered at an angle $\gamma$ of about 20°–45°, preferably about 30°, from the horizontal which surface contacts the valve seat 112 when tapered plug 130 is in the closed position as shown in FIG. 2. The portion of valve seat 112 which is contacted by surface 131 of plug 130 is preferably a sharp edge which acts as a knife which bears against surface 131 when valve 108 closes.

In accordance with the invention, product dispensed through check valve 108 is moved directly to a product discharge opening 152 for discharge to a product mold or container, without being first introduced into an accumulator or the like. Product moving through the vacuumizer outlet and check valve 108 is conveyed directly to discharge opening 152 through open conduit 154 which forms an open and unobstructed passageway between check valve 108 and outlet opening 152. A safety valve 160 is preferably positioned in conduit 154 near the inlet or upstream end of conduit 154. Safety valve 160 may be of any conventional type and is preferably a spring-biased safety valve of the type used in hot water heaters. The safety valve is set to open in the event that high pressure develops in conduit 154 such as would develop if the outlet of conduit 154 is closed when piston 48 moves product through check valve 108. The safety valve is mounted on conduit 154 in such a way as to leave conduit 154 free of obstruction between check valve 108 and outlet 152. Thus the only obstruction in conduit 154 is check valve 108 which is preferably made up of a single compression spring 138, plug 30, shaft 132 and support structure 136 which is preferably removeably secured to outlet fitting 116. Outlet fitting 116 is conveniently in the form of a flanged pipe elbow with means, such as screw threads, provided in an opening at the outside of the elbow, for securing support structure 136 of check valve 108. Elbow 116 is conveniently secured to the outlet 42 of vacuumizer 18 and to conduit 154 by conventional flange fittings.

Conduit 154 may be of metal or plastic material and is preferably flexible, at least in part, to accomodate motion of outlet 152 in a horizontal plane for discharging product into two or more parallel product lines.

As shown best in FIG. 3, cutting means 156 is provided at outlet 152 of conduit 154. A header plate 168 is secured, such as by welding, to conduit 154 and conduit outlet 152 is located at the bottom face of header plate 168. A further header plate 169 is secureable to header plate 168 by bolts or other conventional fastening means not shown. When plates 168 and 169 are secured together, aperture 152' in plate 169 registers with product discharge opening 152. A generally planar knife member 158 is removably mounted on shaft 166 for pivotal movement between plates 168 and 169 in a recess 170 provided in the lower surface of plate 168. Shaft 166 is pivoted by actuation of hydraulic actuator 164 to pivot knife 158 in recess 170 in plate 168. Other than in the area of recess 170, the upper surface of plate 169 is in contact with the lower surface of plate 168, and knife member 158 is freely pivotable in recess 170 when plates 168 and 169 are secured together. A recess or aperture 167 is provided in the upper surface of plate 169 to receive the lower end of shaft 166. A stationary knife blade 162 is removeably secured in a recess of the upper surface of plate 169 with the upper surface of the knife blade substantially coplanar with the upper surface of plate 169 and with the cutting edge of the knife adjacent an edge of aperture 152'. A mating knife blade 160 is removeably secured in a recess of the lower surface of knife member 158 with the lower surface of the knife blade co-planar with the lower surface of knife member 158. Knife member 158 is moveable between a closed position in which member 158 is positioned between apertures 152 and 152' in plates 168 and 169, respectively, thus closing conduit 154 and preventing the discharge of food product therefrom. It has also been found that, in a device utilizing a check valve spring of the size disclosed hereinabove, additional measures to prevent draw-back of product into the vacuumizer during the return stroke of piston 48 are unnecessary. Thus, conduit 154 can be free of any obstruction other than check valve 108 and it is possible to accurately dispense uniform volumes of food product without the need of accumulators or other devices in the product discharge line.

In a preferred embodiment, the food product is discharged to flexible containers in an automatic packaging line 164 in which a plurality of flexible containers are moved in the direction of arrow A below discharge aperture 152. Preferably the knife blade assembly is mounted for automatic movement in the direction of arrow B between a first position over a first line of packages 177 and at least one second position over a second, parallel, line of packages 178. Thus, the product may be discharged into a first package 177 and, after moving the product discharge assembly to a second position, the product may be discharged into a second package 178. At least a portion of conduit 154 is sufficiently flexible to permit the rigid knife blade assembly to be moved to positions above the several parallel package lines.

In a preferred embodiment illustrated in FIGS. 1 and 2, piston 148 is capable of dispensing two product portions of equal volume and weight while moving in two distinct steps in a single direction to the right in the sense of the drawings. Starting from position 48$^a$, the piston moves across the bottom of vacuumizer chamber 18. During this movement, knife member 158 is in position closing outlet port 152. When piston 48 enters the pump cylinder 42, position 48$^b$ in Figure, knife member 158 is pivoted to open outlet port 152. As piston 148 moves in cylinder 42 to position 48$^c$, product is forced through check valve 108 and through outlet port 152. When piston 148 is stopped in position 48$^c$, knife member 158 is actuated to close outlet port 152 and to cut off a pre-determined portion of food product for discharge into an underlying container, and check valve 108 closes. The discharge assembly is then indexed over to an adjacent package line. Knife member 158 is then pivoted to open outlet port 152 and piston 148 is moved forward from position 48$^c$ to position 48$^d$ to discharge a second portion of ham of pre-determined volume equal, if desired, to the previously discharged quantity. Knife member 158 is then actuated to close outlet port 152 and to cut off the second portion of meat product for discharge into an underlying container, and check valve 108 closes. The discharge assemby is then indexed back over the first package line and piston 48 is drawn back to position 48$^a$ with check valve 108 and discharge port 152 both closed. The cycle is then begun again to discharge two product portions into the next two packages, and so on. It will be understood that it is not necessary to have more than one product line. Accordingly, it is not necessary to provide means for indexing the product discharge assembly between adjacent product lines. Moreover, the equipment can be sized to permit the discharge of three or more portions on a single forward stroke of piston 48 and, in that event, it is possible to provide three or more product lines with appropriate indexing of the product discharge assembly relative to each product line.

This invention has been described in detail with particular reference to preferred embodiments thereof, but it will be understood that variations and modifications can be effected within the spirit and scope of the invention.

We claim:
1. Apparatus for dispensing uniform quantities of a ham product comprising:
 (a) a vacuum chamber;
 (b) means for introducing meat pieces into said vacuum chamber;
 (c) means for evacuating said chamber to remove air from said meat pieces therein;
 (d) pumping means for pumping meat product out of said vacuum chamber, said pumping means comprising:
  (i) a pumping chamber at the bottom of said vacuum chamber having an outlet opening at an end wall of said pumping chamber for discharge of meat product therethrough; and
  (ii) A piston moveable at the bottom of said vacuum chamber from a first position outside said pumping chamber to a second position within said pumping chamber, said position fitting closely with in said chamber;

(e) a conduit for conveying meat product from the outlet opening of said pumping chamber to a discharge opening for dispensing said meat product into a container wherein said conduit terminates at its distal end in a first plate having an aperture aligned with said conduit, said conduit being mounted substantially perpendicularly to said plate, wherein a further plate is secured in adjacency with said first plate, said further plate including an aperture in alignment with an opening in said first plate, and wherein said knife member is mounted between said plates and is moveable therebetween in a recess provided in at least one of said plates to accomodate the motion of said knife member therebetween, the remaining portions of the mating surfaces of said plates being in mutual contact;

(f) a hydraulically actuated knife member located adjacent said discharge opening and moveable to cut off meat product dispensed through said discharge opening by motion between a first, open, position adjacent said discharge opening and a second, closed, position in which said knife member covers said discharge opening wherein said knife member is planar and is moveable in a plane perpendicular to said conduit;

(g) hydraulic means for moving said knife member from said first position to said second position and from said second position to said first position; and (h) check valve means in said conduit at the outlet opening of said pumping chamber and comprising;

(i) a valve seat in said outlet opening of said pumping chamber;

(ii) a valve member mounted in said conduit for seating against said valve seat to close said outlet opening of said pumping chamber; and (iii) a unitary spring biasing said valve member against said valve seat, the compressive strength of said valve spring being such that a force of at least 15 psi gage is required in said pumping chamber to open said check valve;

whereby motion of said piston from said first postion to said second position in said pumping chamber moves a predetermined amount of meat product through said outlet opening of said pumping chamber and said conduit to dispense a predetermined quantity of meat product thorough the discharge opening of said conduit, said conduit forming an open passageway free along its entire length of any obstruction other than said check valve.

2. Apparatus according to claim 1 further comprising means for moving said piston from said second position in said pumping cylinder to a third position therein whereby motion of said piston from said second to said third position moves a further predetermined amount of meat product thorough said outlet opening of said pumping chamber and said conduit to dispense a further predetermined quantity of meat product through the discharge opening of said conduit.

3. Apparatus according to claim 1 further comprising safety valve means mounted on said conduit line in such a manner that said conduit is free of obstruction between said check valve and said discharge opening.

4. Apparatus according to claim 1 wherein said unitary spring has a compressive strength of at least 250 lbs.

5. Apparatus according to claim 1 wherein said unitary spring has a compressive strength of at least 300 lbs.

6. Apparatus according to claim 1 wherein said valve seat comprises a sharp edge and wherein said valve member comprises a plug having a tapered surface mating with said sharp edge whereby, on closing said valve, said sharp edge acts as a knife edge bearing on said tapered surface.

* * * * *